United States Patent [19]

Covey et al.

[11] Patent Number: 5,249,231
[45] Date of Patent: Sep. 28, 1993

[54] MEMORY TAGGING FOR OBJECT REUSE PROTECTION

[75] Inventors: Carlin R. Covey, Scottsdale; Hemant K. Gorowara, Tempe, both of Ariz.

[73] Assignee: Motorola, Inc., Schaumburg, Ill.

[21] Appl. No.: 878,280

[22] Filed: May 4, 1992

[51] Int. Cl.$^5$ .......................... H04K 1/00; H04L 9/00
[52] U.S. Cl. .......................... 380/25; 380/4; 395/425
[58] Field of Search .......................... 380/23, 25, 4, 48; 395/425

[56] References Cited

U.S. PATENT DOCUMENTS

| | | | |
|---|---|---|---|
| 4,827,508 | 5/1989 | Shear | 380/4 |
| 4,926,476 | 5/1990 | Covey | 380/4 |
| 5,050,213 | 9/1991 | Shear | 380/25 |

OTHER PUBLICATIONS

An article entitled "Capability Based Tagged Architectures" by L. Lopriore, IEEE Transactions on Computers, vol. C-33, No. 9, Sep. 1984, pp. 786-803.
An article entitled "Modern Computer Concepts" by E. J. Laurie, Fellow, IBM Systems Research Institute, The IBS Series, published by South-Western Publishing Co., Burlingame, Calif., copyright 1970, pp. 270-271.
An article entitled "Tagged Architecture: How Compelling Are its Advantages?", by E. F. Gehringer and J. Leslie Keedy, IEEE 1985, pp. 162-170.
An article entitled "On the Advantages of Tagged Architecture" by E. A. Feustel, IEEE Transactions on Computers, vol. C-22, No. 7, Jul. 1973, pp. 644-656.

Primary Examiner—Stephen C. Buczinski
Attorney, Agent, or Firm—Jeffrey D. Nehr

[57] ABSTRACT

A method and apparatus for memory tagging for object reuse protection which includes a central processing unit (CPU), a memory for storing a data word object and a corresponding tag identifying a first process with a first identification (ID). The memory means is coupled to the CPU. A subject ID register for storing a current process ID for a current process is coupled to the CPU and the memory. Tag checking apparatus for comparing the current process ID to the first ID is coupled to the CPU, to the subject ID register, and to the memory. Control logic is coupled to the CPU, to the memory, and to the tag checking apparatus. The control logic is for denying access to the data word object by the current process if the current process ID does not match the first ID.

22 Claims, 4 Drawing Sheets

MEMORY TAGGING FOR OBJECT REUSE PROTECTION

BACKGROUND OF THE INVENTION

This invention relates in general to the field of data security in a computer, and in particular to memory tag use as a lock for data in a digital computer.

A data security problem exists in a digital computer shared by more than one user, or in a computer which contains data with different security classifications. In most computer systems, portions of the internal memory area of the computer are used for different purposes at different times. A memory area may be assigned to one user process for a period of time, and then later reassigned to another user process. Unless some special security precautions are exercised, the data remaining in a memory area from a previous use is readable by a new user of the memory area. Allowing residual data to be read by the new user is a problem because this provides a means for a user or process to circumvent the system's security policy. A user could view another user's data, or a user without a security clearance could view top secret data.

In computer security terminology, the user processes are referred to as "subjects" and the data areas that they access are "objects". An object is "reused" when it is assigned to a new subject. A secure operating system enforces security by permitting subjects to access some objects, but not other objects.

As user processes run, they often request additional temporary memory space for arrays, stacks, queues, heaps, trees, and input/output (I/O) buffers. Most operating systems maintain a pool of memory space to satisfy these requests. The operating system maps a portion of this memory pool into the requesting process's logical address space and then grants the process read/write access. When the process is finished with the space, it is returned to the operating system's pool. Later, this same memory space may be assigned to another process to satisfy its memory request. If data from the previous user remains in the memory space, the new user can read this left-over data. This is a security problem if new users should not have access to the previous user's data.

A conventional method for dealing with the secure object reuse problem in computer memory is for the operating system to overwrite every word in the memory area before it is assigned to the new user. This may, however, impose a considerable performance penalty. There will be no performance penalty if the operating system has been asked to fill the entire reused memory space with data intended to be accessible to the new user process. But if the memory area is to be empty or only partially filled with data, the operating system must still blank out all areas that will be accessible to the new user. The write operations to accomplish the blanking are additional performance overhead to provide secure object reuse.

If a user process must be prevented from accessing certain areas of memory, the operating system needs some special hardware support that is active even when the operating system is not running. This specialized hardware is referred to as a "memory management unit" (MMU). Its purpose is to check every memory access made by the currently running process against a set of constraints previously established by the operating system. If a memory access transgresses the constraints, the MMU terminates the access by signaling an interrupt to the central processing unit.

The MMU generally provides "address translation", i.e., it translates the memory address furnished by the user process into another address that is actually presented to the memory subsystem. The MMU presents numerous drawbacks, however. The MMU is a relatively complicated piece of hardware that increases system cost and may reduce performance. The monetary and performance costs of an MMU may not be justified in a small computer system. MMUs are not even available for some low-end microprocessors and microcontrollers. Most importantly, most MMUs do not provide fine enough access control to prevent one user from accessing data written into the shared data structure by another user. Often the operating system software must provide this finer level, leading to performance degradation.

Thus, what is needed is a method and apparatus which provides the access constraints necessary to guarantee secure object reuse without the need for an MMU in the system, and without requiring operating system intervention.

SUMMARY OF THE INVENTION

Accordingly, it is an advantage of the present invention to provide a method and apparatus which uses memory tags as a "lock" for data, permitting access only with the proper "key", and which solves the following three security-related problems in digital computers:

(1) To reduce the performance bottleneck associated with providing "object reuse" protection;

(2) To protect data privacy in shared data structures that are used by multiple users; and (3) To permit security policy enforcement without requiring memory management unit hardware.

To achieve these advantages, an apparatus for memory tagging for object reuse protection is contemplated which includes a central processing unit (CPU), a memory for storing a data word object and a corresponding tag identifying a first process with a first identification (ID), the memory means coupled to the CPU, a subject ID register for storing a current process ID for a current process, the subject ID register coupled to the CPU and the memory, tag checking apparatus for comparing the current process ID to the first ID, the tag checking apparatus coupled to the CPU, to the subject ID register, and to the memory, and control logic for denying access to the data word object by the current process if the current process ID does not match the first ID, the control logic coupled to the CPU, to the memory, and to the tag checking apparatus.

To further achieve the advantages above, a method for preventing unauthorized access to written data using memory tags is contemplated, the method comprising the steps of providing a first identification for a first subject, copying the first identification to a first tag associated with the written data when the first subject writes the data, providing a second identification for a second subject attempting to read the written data, comparing the first tag to the second identification, and denying access by the second subject to the written data if the first tag does not match the second identification.

The above and other features and advantages of the present invention will be better understood from the

DETAILED DESCRIPTION OF THE PREFERRED EMBODIMENT

A modification to the design of a digital computer can incorporate into a digital computer a hardware-support mechanism to solve the object reuse problem in an efficient manner. Additional data storage, i.e., a "tag", can be associated with each word in the main memory of the computer. The tag can identify either the portion of software that last wrote data into that particular word in memory, or the operating mode at that time, or both. When a word is read from memory, the mechanism can check the values in its tag to ensure that the reader is authorized to read that particular word. This eliminates the need for the operating system to overwrite memory areas before such memory areas are reassigned.

Several variations on this apparatus and method are possible, but in each case, hardware prevents a program from reading data that does not meet one of the following criteria: (1) the data has been intentionally furnished by the operating system, or (2) the data has been generated by the program itself.

Figure 1:
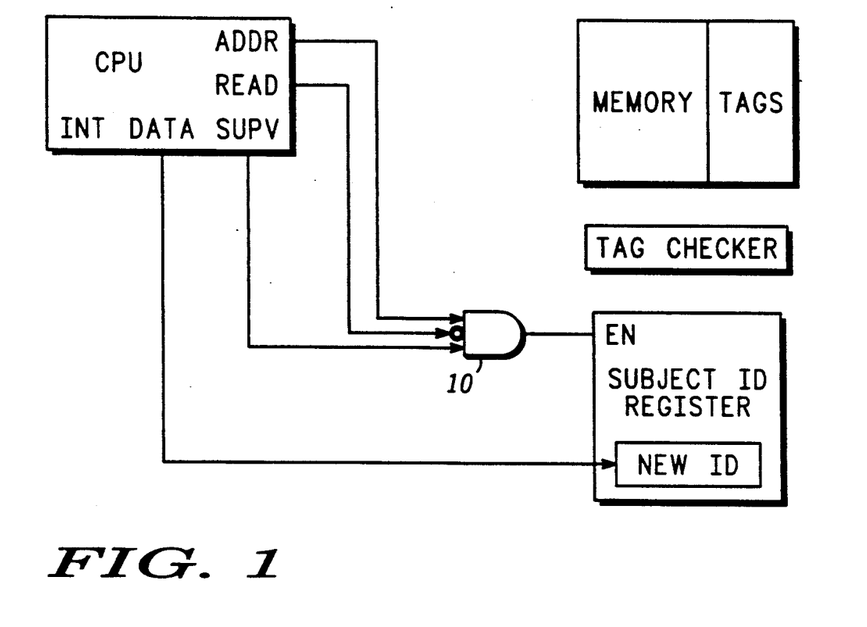
In FIG. 1, there is shown a schematic of a memory tagging hardware support system for secure object reuse changing a subject identification (ID) value in accordance with a preferred embodiment of the invention.

The system for memory tagging to provide secure object reuse requires hardware in the computer system. Specifically, as shown in FIG. 1, the system requires: (1) a tag field on each memory word, (2) a subject ID register, (3) a tag checker, and (4) a small amount of control logic 10 in conjunction with a central processing unit (CPU). The subject ID register must be large enough to store a tag. The tag hardware must be capable of performing a comparison of tag values read from memory with the tag value stored in the subject ID register. The control logic 10 ensures that the mechanism performs the right operations under the right circumstances.

The purpose of the memory tags is to identify either the portion of software that last wrote data into a particular word in memory, or the operating mode at that time, or both. The identified portion of software could be a process in a multiprocessing computer, a process instantiation of a multiply-instantiated process, a process iteration in an iterative process, or a particular software module. The operating mode could be "execute instruction", "read data", "pop return address from stack", or many other modes. In all these cases the identified portion of software will be referred to in the discussion that follows as the "subject". Although the invention can be applied in many different circumstances, the operation of the system will first be described for the case of a main memory with no paging or segmentation.

FIG. 1 illustrates the central processing unit (CPU) of the memory tagging for secure object reuse, the CPU schematically shown with an interface for an address function (ADDR), a read function (READ), a data function (DATA), supervisor function (SUPV), and interrupt function (INT). In addition, FIG. 1 illustrates computer memory with each memory location associated with a memory tag, a tag checker structure, a subject identification (ID) register, and control logic 10.

Before the computer's operating system runs a software application process, the operating system writes the process's ID into the subject ID register, as shown in FIG. 1. Software that is not part of the operating system is prevented from writing into this register, giving the operating system exclusive control of the secure object reuse tagging mechanism. Many different mechanisms can be used for this purpose, including, but not limited to, supervisor mode, protection rings, paging, segmentation, capabilities, etc. In FIG. 1, the supervisor mode signal from the CPU is used to enable writing into the subject ID register so that the subject ID can be changed only when the computer is running in supervisor mode. The operating system changes the subject ID value each time that control of the CPU is given to a different subject.

Figure 2:
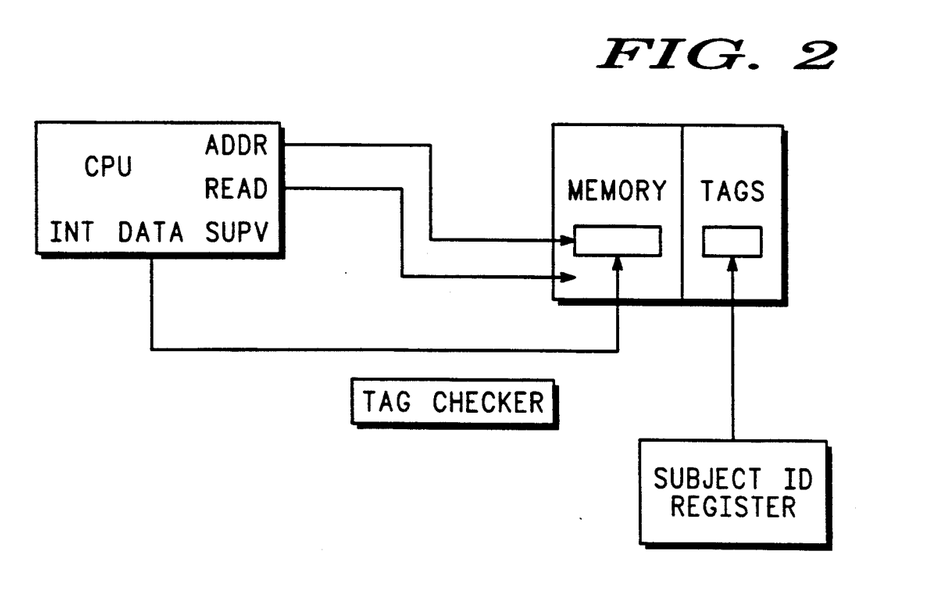
In FIG. 2, there is shown the memory tagging secure object reuse system of FIG. 1 writing the subject ID into a memory tag.

FIG. 2 illustrates the CPU, memory and tags, tag checker and subject ID register of FIG. 1 when the system is writing a subject ID into a tag. When a subject writes into a word of memory, the value of the tag associated with that word is changed to indicate the subject's identity. FIG. 2 illustrates the CPU writing data into memory and the simultaneous writing of a tag associated with the subject ID to the address corresponding to the data in memory. The data that is written into memory is essentially "locked" by the specific tag identifier associated with the data.

Figure 3:
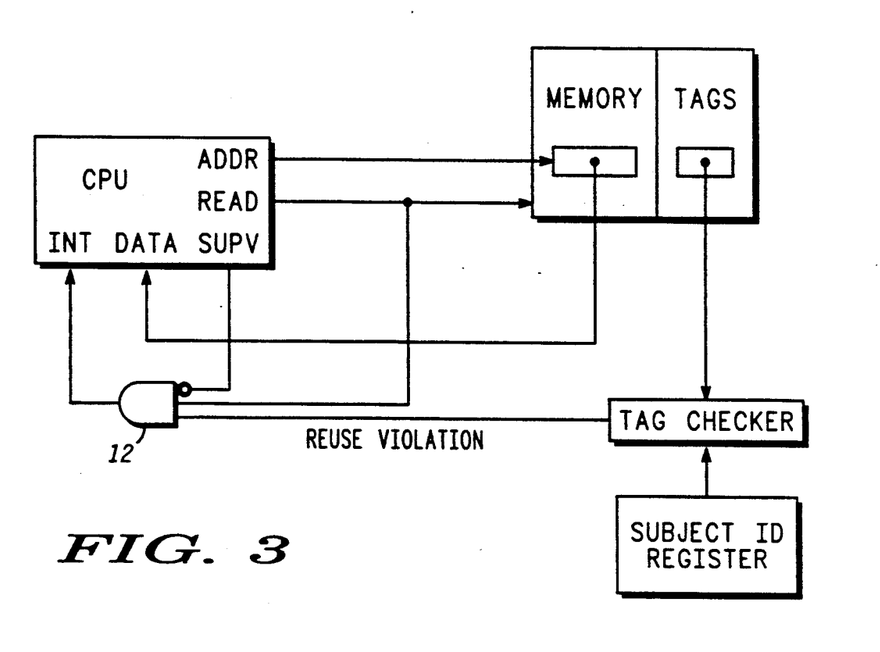
In FIG. 3, there is shown the memory tagging secure object reuse system of FIG. 1 comparing the memory tag with the subject ID.

When an attempt is later made to read the word, the memory tag value is checked to see if the reader is the same as the subject that last wrote that word. Specifically, the memory tagging system compares the tag value to the value in the subject ID register, as shown in FIG. 3. FIG. 3 shows the CPU, memory and tags, tag checker and subject ID register of FIGS. 1 and 2 during the step of comparing the memory tag with subject ID. If the memory tag and subject ID match, the read operation continues unhindered. If these IDs do not match, the read operation can be aborted. The read operation can be aborted by asserting the CPU's bus fault, non-maskable interrupt (NMI) or reset line, or by halting the clock or by removing power. If the hardware aborts the read operation by initiating a trap to the operating system, the operating system may terminate the interrupted process or it may allow the process to continue. In the latter case, the operating system might update some statistics, modify the tag to allow the read operation, and then return to the interrupted process.

In FIG. 3, the control logic 12 guarantees that the generation of an interrupt signal (signal to INT) is enabled only when a read operation occurs. This prevents false triggering of interrupts during write operations. The interrupt is disabled when the computer is running in supervisor mode (signal from SUPV to control logic 12). A disabled interrupt allows the operating system to read any word in memory without generating an interrupt. This is necessary for various operating system functions such as print spooling, disk I/O, garbage collection, message passing, etc. In message passing, data written by one subject must be readable by another subject. When a "send message" function is invoked, the operating system writes the receiver subject's ID into the subject ID register, reads the words of the message and rewrites them. This procedure changes the tag values so that the message is accessible to the receiver. Although workable, this procedure tends to be inefficient since it requires reading and rewriting every word of the message. Improvements to this procedure are described below.

The number of memory accesses required to make a message accessible to the receiver can easily be cut in half by eliminating the need to read the words before rewriting them (as is shown in FIG. 2). This can be accomplished by providing the operating system with a means to write the memory tags without altering the data in the memory word. One simple way to do this is to map the addresses of the tags into two different memory spaces. When a process or the operating system writes into one of these spaces, both the memory data and the tags are written. When the operating system writes into the other space, only the tags are written. The supervisor mode signal is used in the address decoding so that only the operating system can write into this second memory space.

The size of the tag field determines the number of subjects that can be distinguished. For an n-bit tag field, at most $2^n$ subjects can be differentiated. Therefore, a memory area can be reassigned multiple times among $2^n$ different subjects without the need to blank it by overwriting. With operating system intervention it is possible to accommodate more than $2^n$ subjects in the system. To do this the operating system assigns the same subject ID to more than one subject, but ensures that no memory areas are reused between subjects with the same ID unless all words in the area have first been overwritten by the operating system.

Memory tagging for secure object reuse protection can be used with any off-the-shelf CPU by providing some additional hardware to drive the CPU's bus error, nonmaskable interrupt, or reset input, or for CPUs lacking these inputs, by stopping the clock or by removing power. Many extensions of the mechanism are possible. Memory tagging for secure object reuse protection can be applied to register files, cache memories, random access memories, magnetic or optical recording disk or tape storage, or any other data recording medium. In each case, the mechanism incorporates an n-bit tag for each separately accessible data element on the storage medium. The invention is described in this disclosure represents implementation for a random-access main memory, but the method and apparatus are equally applicable to any data storage medium using any access discipline.

Many different variations on the invention are possible. Some of these variations include use of various tag checking methods, alternative actions that can be taken when a read violation occurs, mode-specific tag checking, multiple subject ID registers, and different memory allocation strategies.

The simplest tag checking algorithm involves testing that the tag value read from memory is an exact duplicate of the value in the subject ID register. More elaborate tag checking algorithms are possible, and may be desirable in particular circumstances. For instance, it may be desirable to allow data written by one subject to be read by multiple readers by having the tag checking hardware allow several subject IDs to "match" the same tag value. In particular, it may be desirable for the operating system to have a "public ID" that permits reading by any subject. The public ID would be used on the tags for public data structures and shared program code. The operating system would also need a "private ID" that prevents subjects from reading the operating system's private data.

As another example of tag checking, it may be desirable to allow data written by multiple subjects to be read by one particular subject. In this case the checking hardware could allow several tag values to "match" one subject ID. An alternative to performing this check in hardware would be for the hardware to trap to the operating system when a non-exact match is detected, leaving it to the software to do a more elaborate many-to-one check. Having the software do the many-to-one check would generally only be advantageous if this operation were infrequent.

Many different ID encodings could be used for these many-to-one matching algorithms. As an example, ID encodings could be based on a bitwise "dominance" relation. In a dominance relation, one bit pattern dominates another bit pattern if the first has "1" bits in all positions that contain "1" bits in the second. The first is dominated by the second if the second has "1" bits in all positions that "1" bits appear in the first. If neither bit pattern dominates the other, the bit patterns are noncomparable. For instance, for the case of 4-bit tags:

> 1001 dominates 1000, 1001 is dominated by 1101, and 1001 is noncomparable to 1010; 1110 dominates 1110, 1110 is dominated by 1110, and 1110 is noncomparable to 0111; 1001 dominates 0001, 1001 is dominated by 1011, and 1101 is noncomparable to 1011.

A tag checking algorithm could use the dominance relation functions to terminate a read operation if the subject ID and the memory tag are noncomparable, but otherwise allow the read operation to proceed. ID values can thus be assigned so that many subjects can read data written by one subject, one subject can read data written by many subjects, or some combination of the two can occur. If two subjects are not allowed to read each other's data, they are assigned noncomparable ID values.

The advantage of tag checking based upon the dominance relation is that the hardware is relatively simple. A significant disadvantage is that it becomes increasingly difficult to find appropriate subject ID values as the number of subjects increases. For many combinations of readers and writers, only a small fraction of ID values can be utilized.

A much more flexible technique is to determine via table lookup whether a particular read operation is permitted. A lookup table allows complete freedom in assigning subject IDs and allows full utilization of all ID values.

Figure 4:
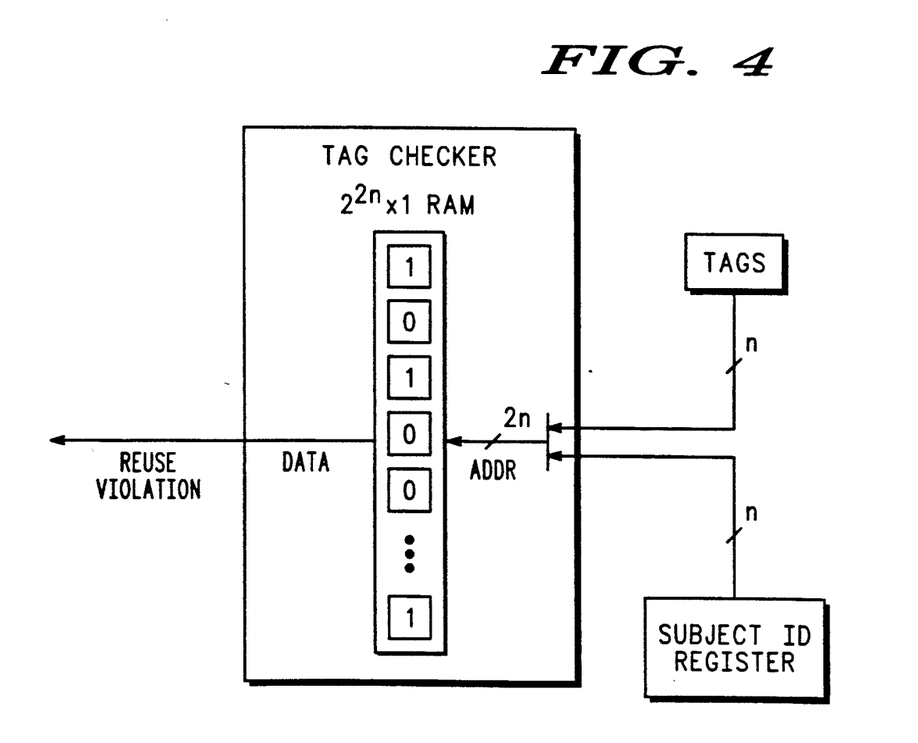
In FIG. 4, there is shown the memory tagging secure object reuse system of FIG. 1 comparing the memory tag with the subject ID via table lookup.

FIG. 4 illustrates a table lookup mechanism implementation. The two n-bit ID values (one from the subject ID register, the other from the current memory tag) to be matched are input as a single 2n-bit address to a $2^{2n}$ by one-bit RAM operating as a tag checker. The value read from the RAM drives the tag checker's reuse violation signal, as shown. The operating system initializes this RAM with a lookup table appropriate to the currently active combination of reader and writer subjects.

Object reuse security is enforced by denying a new user of a memory area access to data left by previous users. If a subject attempts to read data that was left in this area by a previous subject, the memory tagging object reuse protection system will detect a mismatch between the new subject ID value and the value read from the word's tag. When a mismatch occurs, there are several different ways that the hardware can react. The system can abort the read operation by asserting the CPU's bus fault, non-maskable interrupt (NMI) or reset line, or by halting the clock or by removing power from the CPU. An alternative to aborting the read operation is to allow the operation to proceed, but in modified form.

Object reuse security can be guaranteed, for example, by substituting a fixed pattern (for instance, all zeros) for the data actually stored in memory. When a potential object reuse violation is detected, the system forces a fixed bit pattern onto the data bus and allows the read operation to continue. The new user of the data area is denied access to the previous user's data, because the new user has access only to data it has written or to the fixed pattern. Substituting the fixed value may lead to erroneous processing, but only for "misbehaving" processes, i.e., subjects that are attempting to snoop on other subjects' data. Substituting a zero value may actually lead to performance improvement in some cases. There are some operating systems that guarantee that all newly-assigned data areas are filled with zeros. The operating system does this by overwriting all words in the memory area. The memory tagging providing object reuse protection can eliminate such performance overhead and still guarantee that the application processes receive all-zero data areas. However, a disadvantage of this technique is that it may alter the memory timing. The system cannot determine whether it must force a fixed pattern onto the bus until the tag field has been read, so this may impose an additional delay during read operations. Such a delay can be minimized or avoided by utilizing faster RAM for the tag fields, however.

If the tag checker causes a non-maskable interrupt instead of permitting the read operation to continue, then the operating system can take one of several courses of action: (1) The operating system can itself clear the memory word and allow the application process to continue the read operation; (2) the operating system can allow the read operation to continue without clearing the memory word; or (3) the operating system can terminate the offending process. The operating system can tailor its response to take into account the circumstances when the violation occurred. For example, if the illegal read access occurred when the process was retrieving a return address from a stack (i.e., executing a "return" instruction), then the process should be terminated because this is indicative of a serious error. But if the read operation was a data access, the operating system might simply substitute a zero value and allow the operation to continue. If the operating system determines that the "offending" process was an attempt to access a shared semaphore variable, the operating system can allow the read to continue without any substitution. Alternatively, the operating system may substitute a "safe" value based upon the actual value in the semaphore. Such an approach would be useful if it were necessary to reduce the capacity of covert communication channels. In any case, the operating system can always be set to record an audit event of the attempted object reuse security violation.

In some circumstances it may not be feasible or appropriate to continue processing after an object reuse violation. For example, continued processing is not feasible if the computer lacks a non-maskable interrupt. Also, continued processing is not appropriate in a system in which an object reuse violation indicates an unrecoverable software error or hardware fault. In either case, when an object reuse violation is detected, the system halts all processing by generating a reset, by halting the clock, or by disconnecting the power.

The essence of the memory tagging for object reuse protection is that during read operations a current-subject identifier is compared to a tag associated with the word read from memory. The current-subject identifier is contained in a subject ID register.

The object reuse protection scheme described, however, can be generalized to include all means by which an identifying bit pattern is associated with the currently-running subject, i.e., to comprise "modespecific" tag checking. For instance, many CPUs allow instruction fetches to be distinguished from data read operations. If an operating system guarantees that newly-assigned areas are all set to values of zero, performance can be improved by having the hardware substitute a zero value for the previous value in memory. But if the hardware were to substitute a zero value for an instruction fetch, the software would probably crash. Instead, the secure object reuse hardware might treat instruction fetches differently from data reads.

Usually instruction words will be tagged with the operating system's public ID because they are written by the operating system itself during the program loading process. The tag checker will allow fetches of instruction words that are tagged with the operating system's public ID, just as it allows data reads of words tagged with a current subject ID. But if an instruction word has been written by another process, it will be tagged with that process's ID, and the tag checker will detect a mismatch. If there is no security concern associated with fetching instruction words that were written by another process, the hardware would allow the fetch operation to proceed normally. If security is a concern, however, the system can substitute a value that would initiate a trap to the operating system. The choice between these actions might be predetermined for particular processes, or for particular memory tag values.

In many cases it may be desirable to prevent a process from executing instruction words that the process has written (i.e., self-modifying code). To prevent this, the tag checker can be set to allow reading data tagged with the process's own ID, but to prohibit fetching instructions tagged with any ID other than the operating system's public ID.

Figure 5:
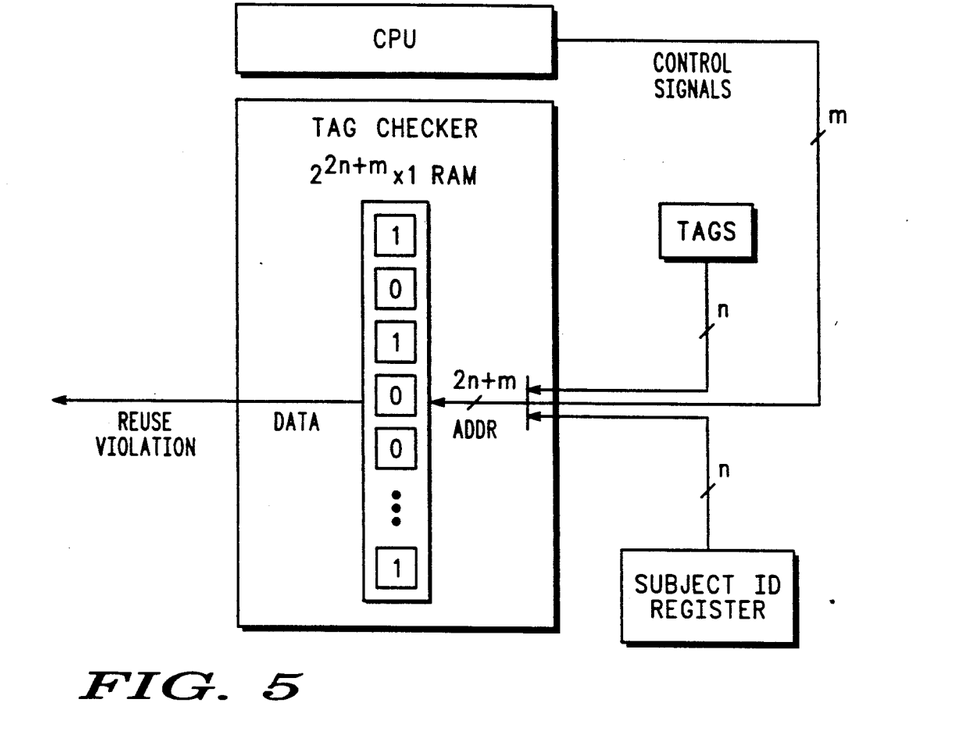
In FIG. 5, there is shown a memory tagging secure object reuse system with mode-specific tag checking.

FIG. 5 illustrates an implementation of mode-specific tag checking. The CPU issues m control signals to the tag checker $2^{2n+m} \times 1$ RAM. The tag from the current subject and the tag from the subject ID register are compared. If a security concern is present, a reuse violation signal is generated.

To permit more flexibility in the secure object reuse method, a process can have separate identifies established for reading and writing operations. Two separate registers can be provided, one used during read operations (a "reader ID" register) and one used during write operations (a "writer ID" register). For example, a process may need to transfer a message from one subject's memory space to another subject's memory space. Such a transfer would have to be assigned a reader ID such that the first process's memory space can be read and a writer ID such that the second process can read the message. As another example, a process may be assigned a reader ID that permits it to read words with many different ID values, but record only one specific ID value when it writes. This identification scheme would be useful for utility processes associated with the operating system, such as garbage collection.

In secure object reuse protection, each active process is ideally assigned a unique subject ID. But if the system uses n-bit tags and has more than $2^n$ active processes, some ID values have to be reused. The operating system must ensure that a memory area is not reassigned to another process using the same ID value as a previous owner of the area, which requires the system to keep track of the previous ID values used for each memory area. If there are many memory areas and many ID values, the lists of previously-used IDs can grow unreasonably large. While a simple alternative is to use the ID values in some regular sequence, and then store only the current position in the sequence, this alternative has the severe disadvantage that the memory areas must be assigned to processes in a particular order.

A more workable alternative is to provide separate subject ID registers (or Writer and reader ID registers) for each memory area. A process is then known by different IDs when accessing different memory areas. The separate subject ID register scheme permits the operating system to reassign an area to any process simply by choosing a subject ID value that has not yet been used for that area. One way to keep track is to assign the subject ID values sequentially. This imposes no restriction on the order in which the memory areas are reassigned to processes, because the next available subject ID can be assigned to any process. An additional difficulty involves activating the correct set of subject IDs for the current process that is running. One solution is to provide a subject ID register for each memory area that a process can access. As the process reads or writes into a particular memory area, the appropriate subject ID register is selected based upon the memory area's address.

Figure 6:
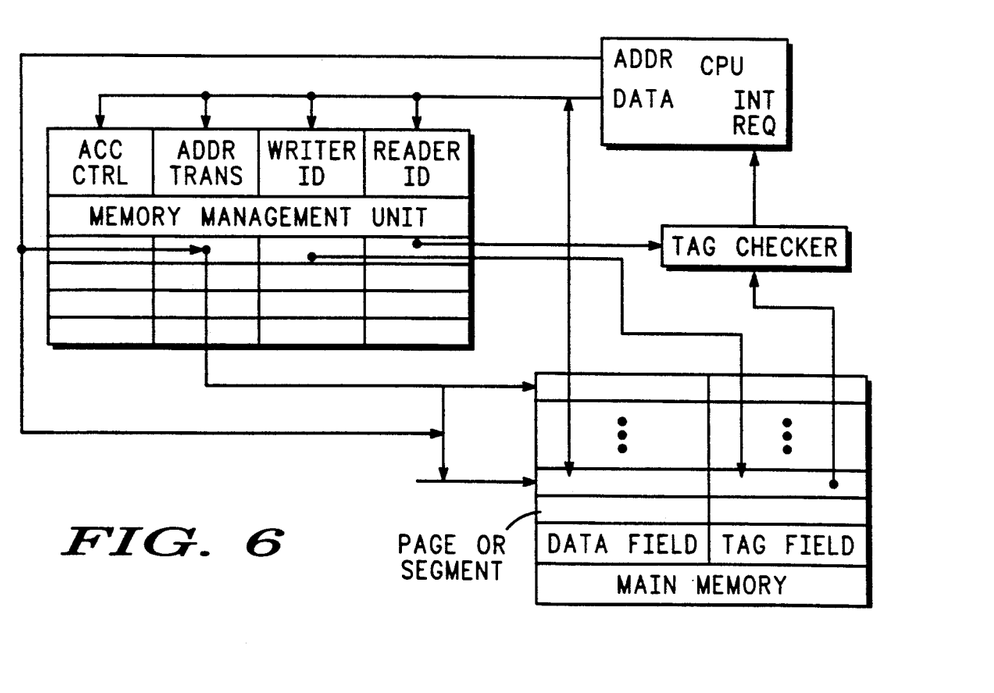
In FIG. 6, there is shown a memory tagging secure object reuse system incorporating subject ID registers into page or segment descriptors.

In a computer system that uses paging or segmentation, the subject ID registers can be incorporated into the page or segment descriptors, as shown in FIG. 6. FIG. 6 illustrates the main memory, including data and tag fields, with page or segment areas defined within the data and tag fields. A memory management unit (MMU) functions as an interface between the CPU and the main memory, providing more specific address information to the pages and segments within the memory via an address translator. Writer ID information from a specific page or segment descriptor within the MMU is placed into the appropriate tag field of the main memory when a write operation is performed to the corresponding data field of the main memory. When a read operation is to be performed, the tag checker compares the appropriate page or segment reader ID to the tag associated with the stored data. Access to the stored data can depend on matching the reader ID and tag value. Multiple processes can access the same memory area simultaneously, with each process using different reader and writer IDs.

As user processes run, they require use of additional temporary memory space. Such memory space is returned to a memory pool after use, and must be kept available to satisfy additional process demand. Conventional technology for providing secure object reuse requires the use of a memory management unit (MMU), and requires the operating system to overwrite portions of the areas that are accessible to the process. The memory tagging for secure object reuse protection method and apparatus described here greatly reduces the need to overwrite memory areas to provide object reuse security, guarantees secure object reuse without the need for MMU hardware, and guarantees privacy without the need to match operating system data structures to MMU limitations.

Figure 7:
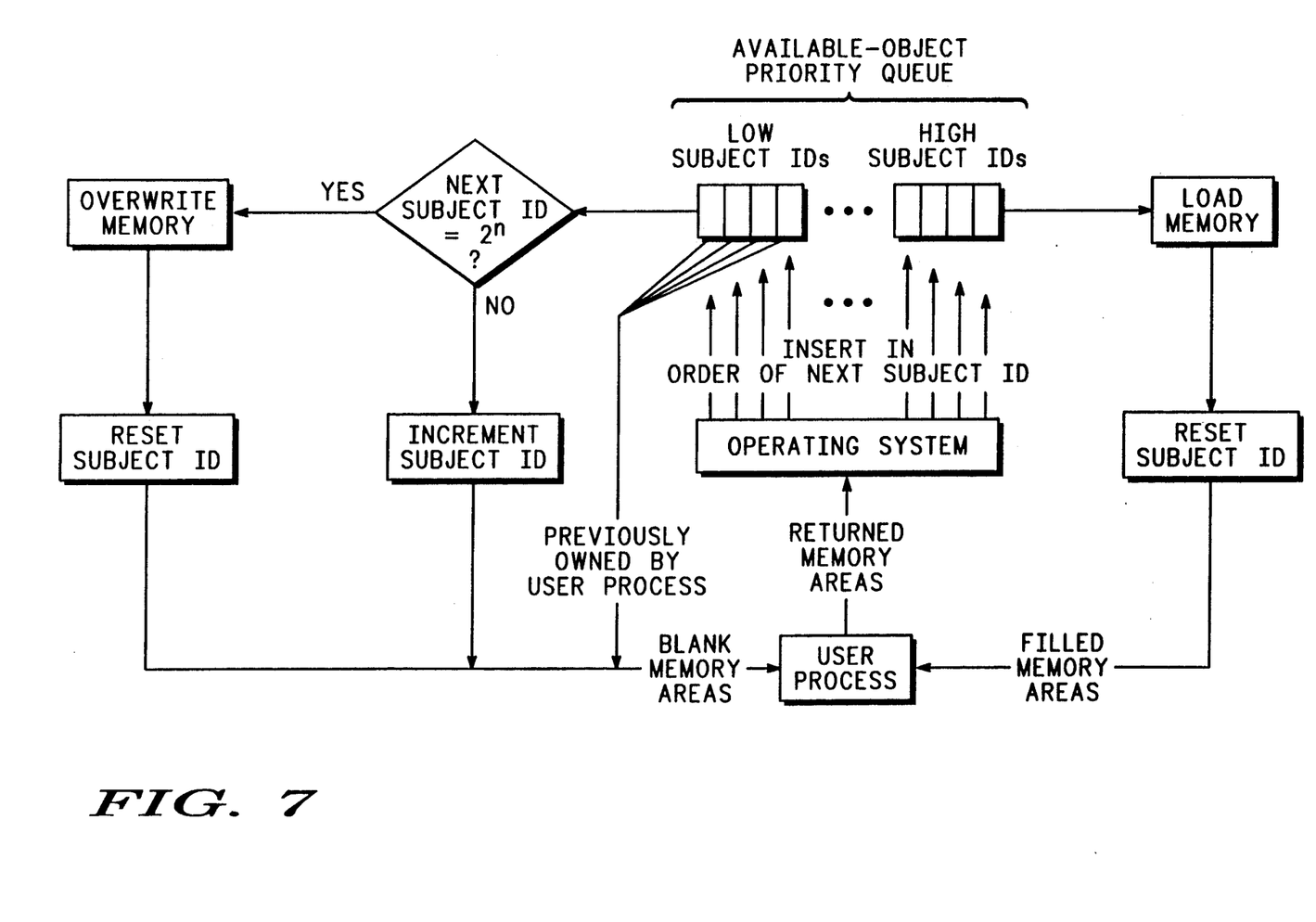
In FIG. 7 there is shown a method for allocating memory areas to form an available object priority queue for a memory tagging secure object reuse system.

FIG. 7 illustrates a particularly efficient algorithm for use of this apparatus and method that further reduces overwriting by inserting returned memory areas into a double-ended priority queue. When a process requests a memory object, an object is selected from the priority queue so as to minimize overwriting. If a memory area can be found in the queue that the process had owned earlier, there is no need to assign a different subject ID. This postpones the time when the memory area must be overwritten and increases the likelihood that it will not have to be overwritten unnecessarily. Each time that a memory area is reallocated, a subject ID must be assigned that is not already in use with that area. After an area has been reallocated $2^n$ times (for an n-bit memory tag), the supply of unique subject IDs has been exhausted. At that time, the memory area must be overwritten and the memory tag values reset to their initial value, as shown in the left loop of FIG. 7. If a memory area is to be filled with program or data before it is made accessible to a process, the tag values will all be set to the same value, i.e., the subject ID of the requesting process. If a separate subject ID register is used per process per memory area (for instance, if these registers are combined with page or segment descriptors as in FIG. 6) then the subject ID can be reset to its initial value, as shown in the right loop of FIG. 7. When a process requests an "empty" memory area, an area is picked that will not require overwriting soon. Conversely, when a process requests that a new memory area be filled with program or data, an area is picked that will require overwriting soon. This algorithm for reallocating memory areas minimizes the times that memory areas have to be overwritten.

Privacy protection for shared data structures is provided without wasting memory area or requiring separate data structures for each user. Fine-grained access control, which memory management units lack, is provided by the apparatus and method described herein. Each user can read back data that the user has written, but cannot read the data written by any other user. Any attempt to read another user's data can be aborted. A process can access data that it had previously written, even though other processes may have written into the same page of memory in the interim. For instance, multiple subjects may share the same stack space in memory, or an interrupt service routine may utilize the stack space of the currently running process. An undisciplined subject will not be able to view data left in the stack by other users, but will still be able to access its own data left on the stack.

The secure object reuse protection method and apparatus described can be used to improve the performance of secure computer systems, or to reduce the cost and complexity of secure embedded computers. Security for reused storage objects or privacy protection for shared data structures can be provided. The method and apparatus are adaptable to virtually any computer system, including those that are not designed to incorporate a memory management unit. A memory management unit can be used in addition to the secure object reuse protection system to provide a finer access control than that provided by the memory management unit itself. The method and apparatus is particularly advantageous for communications security equipment applications intended to separate data at multiple security levels, or separate data that is intended for different destinations.

Thus, there has also been provided, in accordance with an embodiment of the invention, a method and apparatus for memory tagging for object reuse protection that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method for controlling access to a data word object in a computer memory using memory tags, the method comprising the steps of:
    copying a first identifying bit pattern associated with a first subject to a first tag field in the data word object in the computer memory when the first subject writes the data word object into the computer memory;
    comparing the first identifying bit pattern in the first tag field to a second identifying bit pattern of a second subject attempting to read the data word object from the computer memory; and
    denying access by the second subject to the data word object in the computer memory if the first identifying bit pattern in the first tag field does not match the second identifying bit pattern.

2. A method for controlling access to data word object as claimed in claim 1, wherein the step of denying access comprises the step of preventing reading of operating system data using an operating system private ID tag.

3. A method for controlling access to a data word object as claimed in claim 1, wherein the step of denying access further comprises the step of aborting a read operation by the second subject.

4. A method for controlling access to a data word object as claimed in claim 1, wherein the step of denying access further comprises the step of forcing a fixed bit pattern to the second subject.

5. A method for controlling access to a data word object as claimed in claim 1, wherein the step of denying access further comprises the step of substituting a safe value for the data word object.

6. A method for controlling access to a data word object as claimed in claim 1, wherein the step of copying a first identifying bit pattern comprises the step of copying a subject identification (ID) register value.

7. A method for controlling access to a data word object as claimed in claim 1, wherein the step of denying access is dependent on a user process.

8. A method for controlling access to a data word object as claimed in claim 1, further comprising the step of identifying at least two identifying bit patterns for each subject, including a subject reader ID register value and a subject writer ID register value.

9. A method for controlling access to a data word object as claimed in claim 1, further comprising the step of selecting a subject reader ID register and a subject writer ID register based on an address in the memory, using a memory management unit (MMU).

10. A method for controlling access to a data word object as claimed in claim 1, further comprising the step of reallocating memory areas from a queue.

11. In a computer, a device for providing object reuse protection, the device comprising:
    a central processing unit (CPU);
    a memory means for storing a data word object comprising a tag field identifying a first process with a first identification (ID), the memory means coupled to the CPU;
    a subject ID register for storing a current process ID for a current process, the subject ID register coupled to the CPU and to the memory means;
    tag checking means for comparing the current process ID to the first ID, the tag checking means coupled to the CPU, to the subject ID register, and to the memory means; and
    control logic means for denying access to the data word object by the current process, if the current process ID does not match the first ID, the control logic means coupled to the CPU, to the memory means, and to the tag checking means.

12. A device for providing object reuse protection as claimed in claim 11, wherein the tag checking means comprises a table lookup means to determine allowed operations.

13. A device for providing object reuse protection as claimed in claim 12, wherein the subject ID register comprises a reader ID register and a writer ID register.

14. A device for providing object reuse protection as claimed in claim 11, wherein the tag checking means comprises a random access memory (RAM) for mode-specific tag checking.

15. A device for providing object reuse protection as claimed in claim 13, wherein the device additionally comprises a memory management unit (MMU) coupled to the CPU, to the tag checking means, to the memory means, to the reader ID register, and to the writer ID register, the MMU for enabling the selection of the reader ID register or the selection of the writer ID register based on an address within the memory means.

16. A method for preventing unauthorized access to a memory word in a computer memory using memory tags, the method comprising the steps of:
    providing a first identification for a first subject;
    copying the first identification to a tag field in the memory word when the first subject writes data into the memory word;
    providing a second identification for a second subject attempting to read the data from the memory word;
    comparing the first identification to the second identification; and denying access by the second subject to the data in the memory word, if the first identification does not match the second identification.

17. A method for preventing unauthorized access as claimed in claim 16, wherein the step of denying access comprises the step of preventing reading of operating system data using an operating system private ID tag.

18. A method for preventing unauthorized access as claimed in claim 16, wherein the step of denying access further comprises the step of aborting a read operation by the second subject.

19. A method for preventing unauthorized access as claimed in claim 16, wherein the step of denying access further comprises the step of forcing a fixed bit pattern to the second subject.

20. A method for preventing unauthorized access as claimed in claim 16, wherein the step of denying access further comprises the step of substituting a safe value for the.

21. A method for preventing unauthorized access as claimed in claim 16, wherein the step of denying access is dependent on a user process.

22. A method for preventing unauthorized access as claimed in claim 16, further comprising the step of selecting a subject reader ID register and a subject writer ID register using a memory management unit (MMU).

* * * * *

UNITED STATES PATENT AND TRADEMARK OFFICE
CERTIFICATE OF CORRECTION

PATENT NO. : 5,249,231

DATED : September 28, 1993

INVENTOR(S) : Carlin R. Covey, et al.

It is certified that error appears in the above-indentified patent and that said Letters Patent is hereby corrected as shown below:

In Column 14, claim 20, line 6, after "the", insert --data--

Signed and Sealed this

Tenth Day of January, 1995

Attest:

Attesting Officer

BRUCE LEHMAN

Commissioner of Patents and Trademarks